(12) United States Patent
Angelini et al.

(10) Patent No.: US 7,171,980 B2
(45) Date of Patent: Feb. 6, 2007

(54) SPRINGLESS REGULATOR VALVE ASSEMBLY

(75) Inventors: Sergio A. Angelini, Tennwil (CH); Bela Miklos, San Diego, CA (US)

(73) Assignee: Johnson Outdoors Inc., Racine, WI (US)

( * ) Notice: Subject to any disclaimer, the term of this patent is extended or adjusted under 35 U.S.C. 154(b) by 271 days.

(21) Appl. No.: 10/871,837

(22) Filed: Jun. 18, 2004

(65) Prior Publication Data

US 2005/0279410 A1    Dec. 22, 2005

(51) Int. Cl.
*F16K 31/165* (2006.01)
*F16K 31/385* (2006.01)

(52) U.S. Cl. .................. 137/494; 137/907; 137/908

(58) Field of Classification Search ............ 137/494 I, 137/495, 906, 907, 908, 505.25, 505.28, 137/505.46, 505.47; 128/204.26
See application file for complete search history.

(56) References Cited

U.S. PATENT DOCUMENTS

| | | | | |
|---|---|---|---|---|
| 3,437,109 A | * | 4/1969 | Carlson et al. | 137/505.25 |
| 3,893,440 A | * | 7/1975 | Dooley | 123/182.1 |
| 4,041,978 A | * | 8/1977 | Leemann | 137/494 |
| 4,064,899 A | * | 12/1977 | Lehmann | 137/269 |
| 4,484,695 A | * | 11/1984 | Fallon et al. | 137/505.25 |
| 4,905,723 A | * | 3/1990 | Pritchard et al. | 137/71 |
| 5,233,976 A | * | 8/1993 | Ferguson | 128/204.26 |
| 5,427,151 A | * | 6/1995 | Pauley | 137/895 |
| 5,549,107 A | | 8/1996 | Garraffe et al. | |
| 5,690,100 A | | 11/1997 | Pomerantz | |
| 5,735,269 A | * | 4/1998 | Preece | 128/205.24 |
| 5,860,447 A | * | 1/1999 | Chu | 137/505.25 |
| 5,950,622 A | | 9/1999 | Pomerantz | |

* cited by examiner

*Primary Examiner*—Stephen M. Hepperle
(74) *Attorney, Agent, or Firm*—Reinhart Boerner Van Deuren P.C.

(57) ABSTRACT

A valve assembly and a regulator for use therein are disclosed. The valve assembly includes a valve poppet having a first end having a first face and a second end having a second face. The first face has a surface area smaller than the surface area of the second face. The second end of the valve poppet is received in a sealed chamber and a passage provides fluid communication between the inlet of the regulator and the chamber for allowing gas accumulating in the chamber to act on the second face for urging the valve poppet in the closed position without the use of a spring.

20 Claims, 4 Drawing Sheets

SPRINGLESS REGULATOR VALVE ASSEMBLY

FIELD OF THE INVENTION

The present invention relates to a regulator for use with an air regulating system having a pressurized air source. More particularly, the present invention relates to an improved regulator that replaces the spring traditionally used to position the valve poppet of a regulator valve assembly with a pneumatically controlled regulator valve assembly.

BACKGROUND OF THE INVENTION

Portable breathing apparatuses of this kind are used for example by divers, by fire fighters when fighting fires or generally whenever air is charged with noxious substances which make unaided breathing impossible. Portable breathing apparatuses usually consist of one or two metal bottles or tanks which are carried for example on the back of the user and in which a highly compressed oxygen gas mixture at a pressure of for example 350 bar is contained. This oxygen gas mixture is designated below, for the sake of simplification, as breathing air, gas, pressurized gas, or simply as air. The breathing air is delivered from the bottles via a shut-off valve and breathed in by the user by means of a so-called demand valve located in a second stage regulator.

Typically, second stage regulators constitute the second of two stages of gas pressure regulation between a pressurized air source (e.g. the one or more tanks of compressed gas) and the respiratory system of a user. As conventionally known, a first stage regulator is operatively connected to the pressurized air source and delivers gas at an intermediate pressure (approximately 150 pounds per square inch (psi) over ambient pressure) to the second stage regulator. A function of the second stage regulator is to then deliver the intermediate pressure gas to the user at a breathable pressure in response to inhalation by the user.

A typical second stage regulator includes a housing, a regulator valve assembly mounted in the housing, a mouthpiece for communicating with the user, and an exhaust valve for expelling exhaled gas. Generally, a typical regulator valve assembly includes a tube sealed to the housing and having an inlet operatively connected to the first stage regulator, a valve orifice mounted in the inlet, a valve poppet mounted in the tube for movement between an open and a closed position with respect to the valve orifice, and a valve seat mounted at the end of the valve poppet. The tube further includes an opening for discharging the pressurized gas into the housing.

In operation, pressurized gas traveling from the first stage regulator passes through the valve orifice of the inlet and against the valve seat mounted at the end of the poppet. The pressure differential between upstream and downstream of the regulator valve assembly is approximately 150 psi. The pressure downstream of the regulator valve assembly is ambient pressure, while the pressure of the gas flow traveling from the first stage regulator is 150 psi over ambient. Traditional second stage regulators employ a mechanical biasing member to help counteract the effect of the pressure differential across the regulator valve assembly and acting on the frontal area of the valve seat. The mechanical biasing member commonly used is a spring. To counteract the difference in pressure, a relatively strong spring is needed to maintain the valve poppet in the closed position during operation. The spring acts on the valve poppet causing the valve seat to compress against the valve orifice (i.e. the closed position) until air is required by the user.

It is also known to use a valve poppet having a longitudinal passage extending through the valve poppet which enables the gas flow to travel through the valve poppet and to act on the backside of the valve poppet to assist in maintaining the valve poppet in the closed position. For example, U.S. Pat. No. 5,549,107 was issued to Garraffa et al. on Aug. 27, 1996 for a "Second Stage Scuba Diving Regulator." However, known regulators using a valve poppet with a longitudinal passage still require a mechanical biasing member to help maintain the valve poppet in the closed position. Such known valve poppets have a backside area that is smaller than the frontal area, and are only able to provide partial force compensation thereby requiring the assistance of a mechanical biasing member.

A disadvantage of using a mechanical biasing member such as a spring to maintain the valve poppet in the closed position is that at the time of manufacturing, each second stage regulator must be checked to ensure that second stage regulator is properly adjusted with respect to the spring. An adjustment is commonly necessary due to the variability of spring constants inherent in any mass produced spring. Spring constants are likely to vary due to changes in material composition, inconsistent temperature changes during manufacturing of the spring, or differences in the manufacturing process itself. In addition, overtime, the repeated use of a second stage regulator (e.g. the continual compressing and relaxing of the spring during operation of the second stage regulator) may cause fatigue in the spring that could require a readjustment of the second stage regulator at a later time.

Accordingly, it would be advantageous to provide a second stage regulator that does not require adjustments at the time of manufacture to compensate for possible spring constant irregularities present in mass produced springs. It would further be advantageous to provide a second stage regulator that does not require a user to make adjustments to the second stage regulator with regard to the mechanical biasing member controlling the position of the valve poppet. It would further be desirable to provide a second stage regulator having a regulator valve assembly that functions smoother than a second stage regulator that employs a mechanical biasing member to control the positioning of the valve poppet. It would further be advantageous to provide a second stage regulator having a regulator valve assembly that eliminates the use of a mechanical biasing member to counteract the intermediate pressure existing at the inlet of the second stage regulator and maintain the valve poppet in a closed position. It would further be desirable to provide a second stage regulator that employs a pneumatically controlled regulator valve assembly.

To provide a reliable, widely adaptable second stage regulator with an improved regulator valve assembly that prevents the above referenced and other problems would represent a significant advance in the art.

SUMMARY OF THE INVENTION

The present invention relates to a valve assembly for use with a breathing apparatus having a pressurized gas source connected to a regulator having a housing and an inlet. The valve assembly comprises a valve support member coupled to the housing, and a valve poppet moveably coupled to the valve support member for movement between an open position and a closed position with respect to the inlet. The valve poppet has a first end having a first face and a second end having a second face. The first face has a surface area smaller than the surface area of the second face. The valve assembly further comprises a chamber configured to accept the second end of the valve poppet, and a passage providing fluid communication between the inlet of the regulator and the chamber for allowing gas accumulating in the chamber to act on the second face for urging the valve poppet in the closed position without the use of a spring.

The present invention also relates to a second stage regulator for use with an air regulating system having a pressurized air source. The second stage regulator comprises a housing having an inlet configured to be operatively coupled to the pressurized air source, and a valve assembly coupled to the inlet. The valve assembly comprises a valve support member coupled to the second stage regulator, and a valve poppet moveably coupled to the valve support member for movement between an open position and a closed position with respect to the inlet. The valve poppet has a first end having a first face and a second end having a second face. The first face has a surface area smaller than the surface area of the second face. The valve assembly further comprises a chamber configured to accept the second end of the valve poppet, and a passage providing fluid communication between the inlet of the second stage regulator and the chamber for allowing gas accumulating in the chamber to act on the second face for urging the valve poppet in the closed position without the use of a spring.

The present invention further relates to an underwater breathing system for use with a supplied gas. The system comprises a first stage regulator coupled to the supplied gas and a second stage regulator coupled to the first stage regulator by a conduit. The second stage regulator comprises a housing having an inlet configured to be operatively coupled to the first stage regulator, a valve support system coupled to the housing, and a valve poppet having a first end having a first face and a second end having a second face. The first face of the valve poppet has an active surface area smaller than an active surface area of the second face. The valve poppet is moveably coupled to the valve support system for movement between an open first position and a closed second position with respect to the inlet. The second stage regulator further includes a chamber configured to accept the second end of the valve poppet in a slidable manner, and a passage providing fluid communication between the inlet of the housing and the chamber for allowing gas to accumulate in the chamber and act on the active surface area of the second face to urge the valve poppet in the closed second position without requiring a spring.

The present invention further relates to a valve poppet for use with a diving regulator. The valve poppet includes a body having a first end and an opposite second end, the first end having a first active surface area and the second end having a second active surface area. The first active surface area is smaller than the second active surface area. The valve poppet further includes a channel extending from the first end to the second end.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF PREFERRED AND OTHER EXEMPLARY EMBODIMENTS

Figure 1:
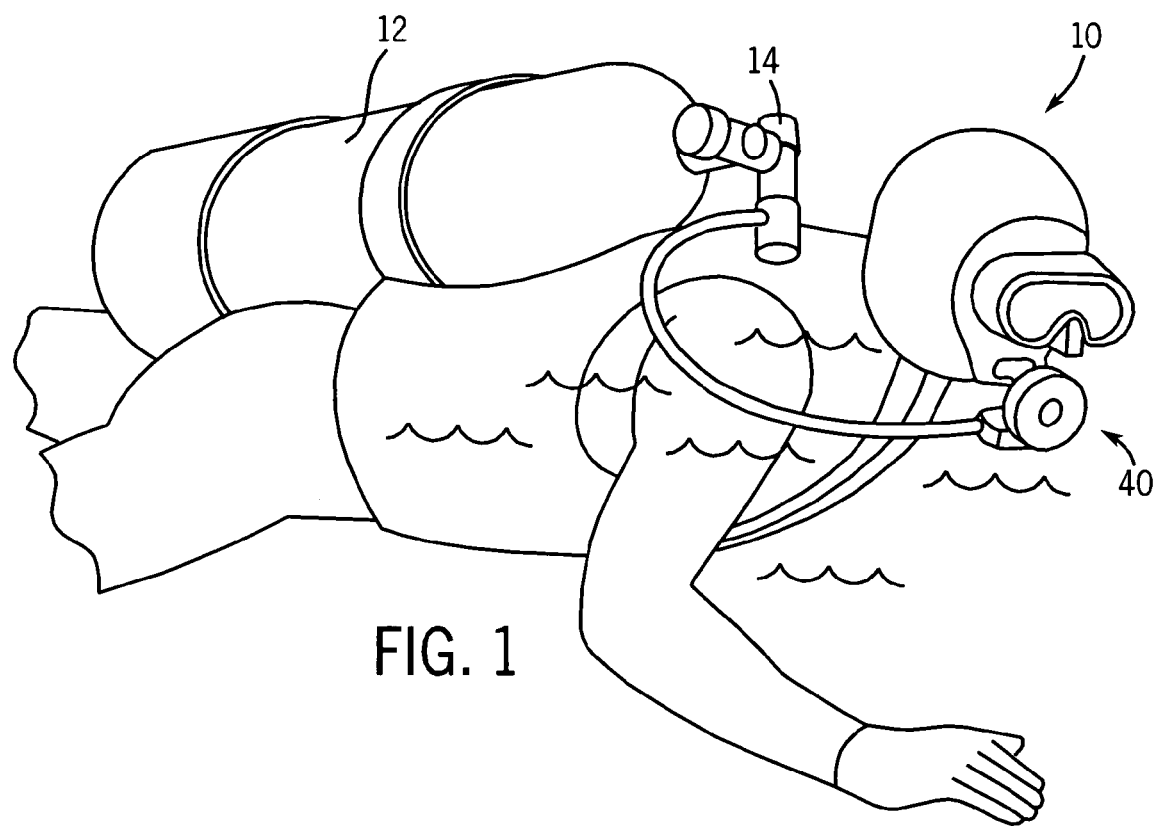
FIG. 1 is a perspective view of an air regulating system according to a preferred embodiment.

Before proceeding to the detailed description of a preferred and exemplary embodiments, it is to be understood that the invention is not limited to the details of construction and the arrangement of the components set forth in the following description or illustrated in the drawings. The invention is capable of other embodiments or being practiced or carried out in various ways. For example, the invention is limited to use by divers and may be applicable whenever air is charged with noxious substances which make unaided breathing impossible such as by fire fighters when fighting fires. It is also to be understood that the phraseology and terminology employed herein is for the purpose of description and should not be regarded as limiting.

Referring to FIG. 1, an underwater breathing system is shown having a pressurized tank 12, a first stage regulator 14, and a second stage regulator 40. While the disclosed embodiments will be illustrated as a second stage regulator designed for underwater diving, the features of the disclosed embodiments have a much wider applicability. For example, the second stage regulator is adaptable for any air regulating system incorporating a second stage regulator (e.g. air regulating systems for firefighters, pilots, hazardous waste or toxic environment workers, etc.).

Figure 2:
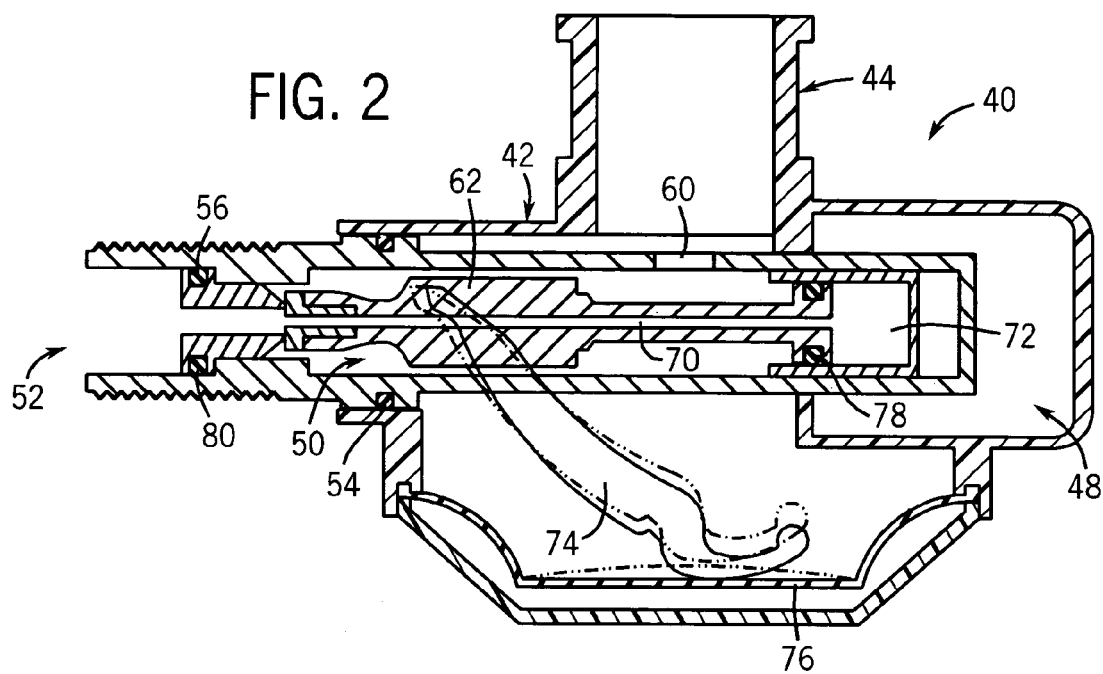
FIG. 2 is a cross sectional view of a second stage regulator according to a preferred embodiment while in the closed position.
Figure 3:
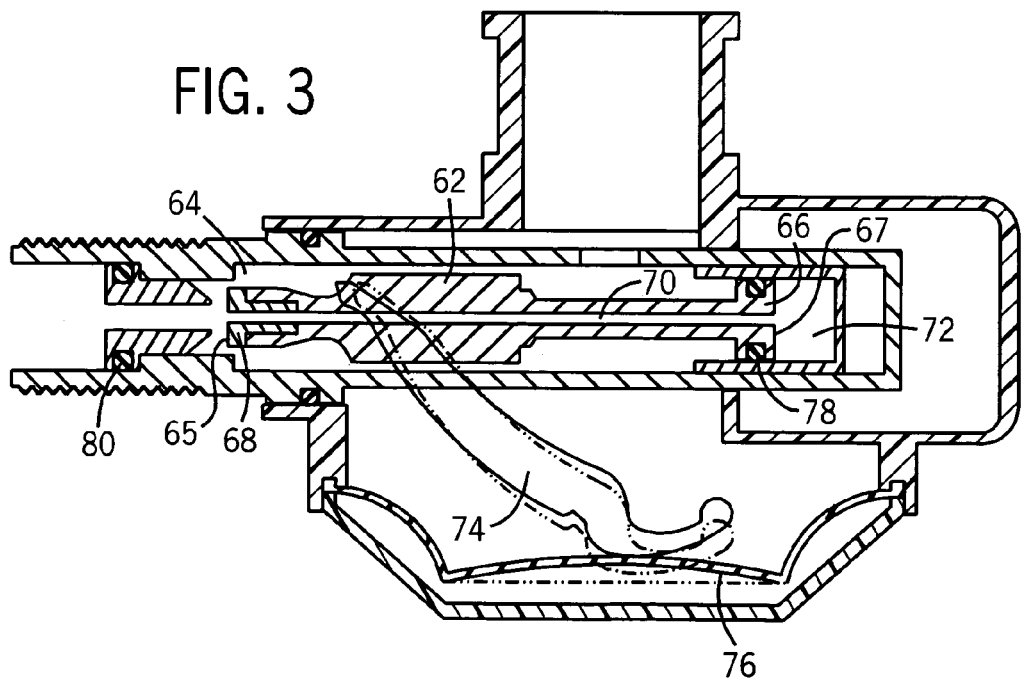
FIG. 3 is a cross-sectional view of a preferred embodiment of the regulator valve assembly in the open position.

Referring now to FIGS. 2 and 3, and according to a preferred embodiment, second stage regulator 40 includes a valve assembly (e.g. demand valve, control valve, etc.) shown as regulator valve assembly 48. Regulator valve assembly 48 is coupled to a housing 42 and generally comprises a first chamber (e.g. air barrel, valve support member, etc.) shown as air chamber 50 having an inlet 52. Inlet 52 is operatively coupled to the first stage regulator typically by means of a conduit. According to a particularly preferred embodiment, air chamber 50 is a tube made from metal (e.g. brass, copper, aluminum, titanium, etc.). Alternatively, air chamber 50 may be any support member, made of any suitable material, configured for receiving and movably supporting a valve (shown as valve poppet 62), such as molded plastic. According to a preferred embodiment, air chamber 50 is sealed to housing 42 by an O-ring 54. Alternatively, air chamber 50 and housing 42 are fused together or are integrally formed as a unitary one-piece unit. A high pressure valve orifice 56 is coupled to a first end of air chamber 50. An outlet 60 is provided in air chamber 50 for discharging the pressurized gas into housing 42 when air is required by the user. According to a preferred embodiment, high pressure valve orifice 56 is sealed to inlet 52 by use of an O-ring 80. As can be appreciated, a seal may be formed between high pressure valve orifice 56 and inlet 52 in a variety of ways such as gaskets, fusing, integrally molding, press fitting, etc.

Valve poppet 62 is positioned in air chamber 50 and configured to move from an open, unseated position to a closed, seated position with respect to high pressure valve orifice 56. According to a preferred embodiment, valve poppet 62 is configured to slidably move from the open position to the closed position. In the open (i.e. unseated) position valve poppet 62 opens high pressure valve orifice 56 (illustrated in FIG. 3), and in the closed (i.e. seated) position valve poppet 62 seals high pressure valve orifice 56 (illustrated in FIG. 2). Valve poppet 62 has a first end 64 having a first cross sectional area (e.g. exposed surface, first active surface area, etc.) shown as a first face 65, and a second end 66 having a second cross sectional area (e.g. exposed surface, second active surface area, etc.) shown as a second face 67. First face 65 and second face 67 are the exposed frontal surfaces upon which the pressurized gas acts. The area of first face 65 is less than the area of second face 67. According to an exemplary embodiment, the area of the first face is between 50 percent and 99 percent the area of the second face. According to a preferred embodiment, the area of second face 67 is only slightly larger than the area of first face 65. According to a particularly preferred embodiment, the area of the first face is 75 percent the area of the second face. Alternatively, the dimensional relationship between the area of second face 67 and first face 65 may be configured in any of a variety of ratios, proportions, or size-relationships based on the desired performance, so long as the area of second face 67 is greater than the area of first face 65.

Configuring the area of second face 67 to be greater than the area of first face 65 advantageously enables the elimination of the spring conventionally used to bias a valve poppet in a closed position. Instead of a spring biasing the valve poppet in the closed position, valve poppet 62 may be maintained in the closed position pneumatically because the magnitude of the force acting on second face 67 is greater than the magnitude of the force acting on first face 65. The development and magnitudes of such forces is explained below.

According to a preferred embodiment, a valve seat 68 is coupled to first end 64 of valve poppet 62. Referring to FIG. 3, in the closed position valve seat 68 is compressed against high pressure valve orifice 56 to seal off high pressure valve orifice 56. Valve seat 68 defines first face 65 upon which the pressurized gas traveling from the first stage regulator acts. Therefore, according to a preferred embodiment, the exposed frontal area of valve seat 68 is smaller than the area of second face 67.

Valve poppet 62 further comprises a passage (e.g. conduit, bore, slot, etc.) shown as a channel 70 that is positioned axially along valve poppet 62. Channel 70 extends from first end 64 to second end 66 of valve poppet 62 for providing fluid communication between inlet 52 of air chamber 50 and a second chamber (e.g. biasing chamber, pressure chamber, collection chamber, etc.) shown as an overbalancing chamber 72. Overbalancing chamber 72 is a sealed chamber configured to accept second end 66 of valve poppet 62 in a slidably reciprocating manner. Overbalancing chamber 72 is configured to accumulate (e.g. receive, accept, gather, collect, store, maintain, etc.) the pressurized gas traveling through channel 70 and to prevent the pressurized gas from undesirably escaping into air chamber 50 and/or housing 42. A slidable seal 78 is positioned between the outer surface of second end 66 and overbalancing chamber 72. Slidable seal 78 enables valve poppet 62 to slidably move between an open and closed position and is intended to prevent the escape of the pressurized gas entering overbalancing chamber 72 through channel 70. According to a preferred embodiment, slidable seal 78 is an O-ring forming a slidable seal between overbalancing chamber 72 and valve poppet 62. Alternatively, slidable seal 78 may be provided in a variety of generally known techniques.

The size (e.g. capacity, volume, etc.) of overbalancing chamber 72 changes depending on whether valve poppet 62 is in the open or closed position. Referring to FIG. 2, overbalancing chamber 72 has a maximum capacity when valve poppet 62 is in the closed position. Referring to FIG. 3, the size of overbalancing chamber 72 decreases as valve poppet 62 is slidably moved into the open position. The size of overbalancing chamber 72 decreases because overbalancing chamber 72 is maintained in a fixed position as valve poppet 62 slidably moves between the open and the closed positions.

Referring to FIGS. 2 and 3, second stage regulator 40 further comprises a demand lever 74 for activating regulator valve assembly 48. Demand lever 74 comprises a pivotally coupled member having a first and second ends. The first end of demand lever 74 is pivotally coupled to regulator valve assembly 48. The second end of demand lever 74 is positioned near a pressure sensitive diaphragm 76. Diaphragm 76 is mounted to housing 42 and, when collapsed, operatively engages the second end of demand lever 74. Demand lever 74 is actuated when diaphragm 76 collapses due to a pressure drop within housing 42. This pressure drop is generally generated by the diver's inhalation. The demand lever pivots about the first end of demand lever 74 to move first end 64 of valve poppet 62 away from high pressure valve orifice 56.

In operation, pressurized gas (gas having an intermediate pressure of generally 150 psi over ambient) travels through a conduit from the first stage regulator towards second stage regular 40. As the pressurized gas approaches second stage regulator 40, the pressurized gas travels through high pressure valve orifice 56 mounted in inlet 52 of air chamber 50 and acts upon first face 65 of valve poppet 62. According to a preferred embodiment, valve seat 68 is coupled to first end 64 and constitutes first face 65 upon which the pressurized gas acts. A first portion of the pressurized gas goes around first face 65 and continues to travel through air chamber 50 in which valve poppet 62 is mounted. In addition, a second portion of the pressurized gas travels through channel 70 which is positioned axially through valve poppet 62. The pressurized gas traveling through channel 70 communicates with and begins to fill overbalancing chamber 72. Slidable seal 78 positioned around the outer surface of second end 66 of valve poppet 62 prevents the pressurized gas that has entered overbalancing chamber 72 from escaping.

As the pressurized gas begins to fill overbalancing chamber 72 through channel 70, the pressure in overbalancing chamber 72 becomes equal to the intermediate pressure present at inlet 52. As pressure builds up in overbalancing chamber 72, the gas pressure within overbalancing chamber 72 generates a force acting on second face 67 of valve poppet 62 in a direction opposite to the flow of pressurized gas traveling from the first stage regulator. The generated force acting on second face 67 slidably moves valve poppet 62 towards the closed (i.e. seated) position. The magnitude of the force generated within overbalancing chamber 72 depends on the area of second face 67 of valve poppet 62 (i.e. force=pressure* area (F=P·A)). The larger the area of second face 67 upon which the pressurized gas acts, the greater the force being applied in the direction opposite the pressurized gas flow.

Regulator valve assembly 48 is designed to utilize the pressure built up in overbalancing chamber 72 to counteract the pressure existing upstream of the first end 64 of valve poppet 62, and to move and maintain valve poppet 62 in the closed, seated position until breathable air is required by the user. Regulator valve assembly 48 is able to move and maintain valve poppet 62 in the closed position without the use of a mechanical biasing member (e.g. a spring). The use of a mechanical biasing member to retain valve poppet 62 in the closed position is eliminated by providing valve poppet 62 with a second face 67 having a greater area than first face 65. By making the area of second face 67 greater than the area of first face 65, the force acting in the direction opposite the pressurized gas flow will be greater than the force acting in the direction of the pressurized gas flow. If the force acting in the direction opposite the pressurized gas flow is greater than the force acting in the direction of the pressurized gas flow, then the force acting in the direction opposite the pressurized gas flow will cause valve poppet 62 to slidably move in the closed position (i.e. compressing first end 64 into high pressure valve orifice 56). The result is regulator valve assembly having a valve poppet that may be maintained in the closed position pneumatically and without the assistance of a mechanical biasing member.

As can be appreciated, when valve poppet 62 slides into the closed position, only the area of first face 65 within high pressure orifice 56 is exposed to the intermediate pressure coming from the first stage regulator. The annular area of first face 65 around high pressure orifice 56 is subject to the pressure existing inside housing 42. This position is illustrated schematically in FIGS. 4 and 5. Once valve poppet 62 slides back from the closed position, gas flow coming from high pressure orifice 56 acts on the entire frontal area of first face 65 (shown in FIGS. 7 and 8). It should be noted that when describing the size relationship between first face 65 and second face 67, the size of first face 65 is referring to the frontal area exposed to the intermediate gas pressure when valve poppet 62 slides back from the closed position, and is not referring to only the area of first face 65 that is exposed to the intermediate gas pressure when valve poppet 62 is in the closed position.

Figure 4:
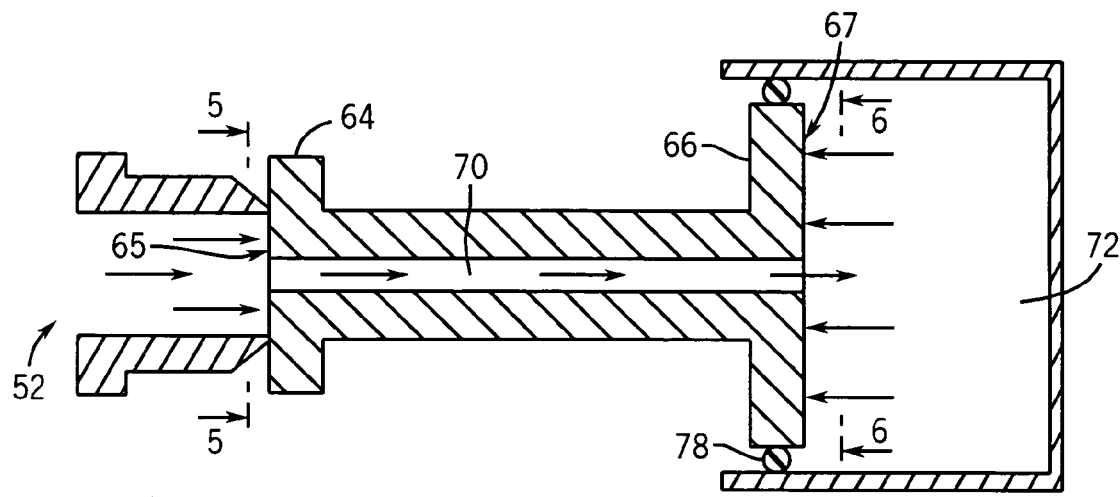
FIG. 4 is a schematic view of the forces acting on a valve poppet while in a closed position during operation of a second stage regulator according to a preferred embodiment of the present invention.
Figure 5:
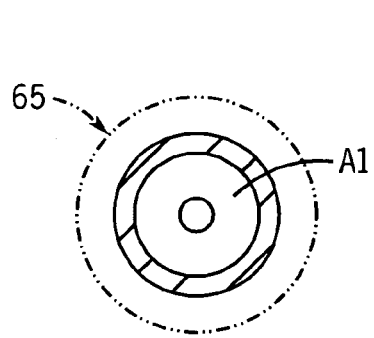
FIG. 5 is a cross-sectional view taken along line 5—5 of FIG. 4 showing a schematic drawing of a first face of a valve poppet.
Figure 6:
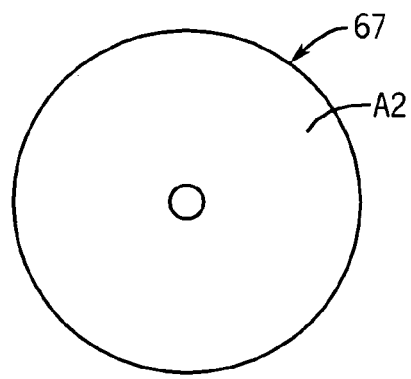
FIG. 6 is a cross-sectional view taken along line 6—6 of FIG. 4 showing a schematic drawing of a second face of a valve poppet.
Figure 7:
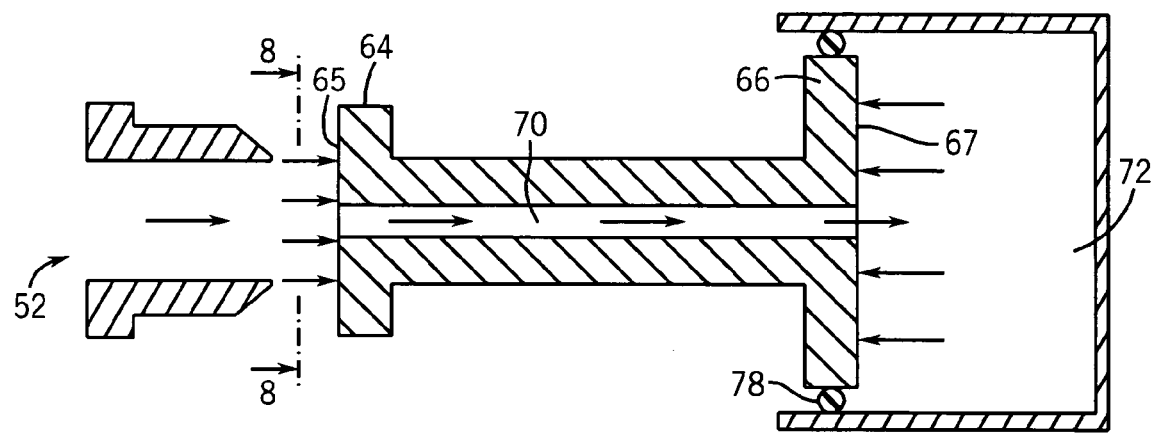
FIG. 7 is a schematic view of the forces acting on a valve poppet while in a opened position during operation of a second stage regulator according to a preferred embodiment of the present invention.
Figure 8:
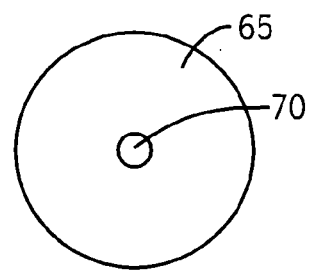
FIG. 8 is a cross-sectional view taken along line 8—8 of FIG. 7 showing a schematic drawing of a first face of a valve poppet.

The relationship between the surface areas and the forces may be further explained using the equation F=P·A; where F is force, P is pressure, and A is area. Referring to FIGS. 4 and 7, $F_1$ is the force acting on first face 65 of valve poppet 62. $P_1$ is the pressure of the gas traveling from the first stage regulator, and $A_1$ is the area of first face 65 upon which the pressurized gas acts. $F_2$ is the force acting on second face 67 of valve poppet 62, $P_2$ is the pressure of the gas in overbalancing chamber 72, and $A_2$ is the area of second face 67 upon which the pressurized gas within overbalancing chamber 72 acts. As the pressurized gas enters overbalancing chamber 72 through channel 70, the gas within overbalancing chamber 72 becomes pressurized to the same intermediate pressure present at inlet 52. Therefore in the mathematical model, represented schematically in FIGS. 4 and 7, $P_1$ equals $P_2$. In a typical application, $P_1$ and $P_2$ are approximately 150 psi over ambient. Since $P_1$ and $P_2$ are equal, it can be seen from FIG. 3 that by making $A_2$ greater than $A_1$, $F_2$ will be greater than $F_1$. If $F_2$ is greater than $F_1$, valve poppet 62 will slidably move from the open position (FIG. 7) into the closed position (FIG. 4) whereby first face 65 is compressed into high pressure valve orifice 56. Movement of valve poppet 62 is achieved pneumatically without the assistance of a mechanical biasing member. The pneumatic movement of valve poppet 62 may advantageously provide for a smoother movement than the movement of valve poppet 62 would be if a mechanical biasing member assisted in the movement. Once valve poppet 62 is in the closed, seated position, $F_2$ will continue to compress first face 65 of valve poppet 62 into high pressure valve orifice 56 to maintain valve poppet 62 in the closed position until breathable air is required by the user.

Referring to FIG. 2, as breathable air is required by the user, breathable air is drawn by the user by inhaling directly into mouthpiece 44. Inhalation by the user creates a pressure drop inside housing 42. The pressure drop in housing 42 causes the pressure sensitive diaphragm 76 to collapse inwardly, thereby engaging and moving demand lever 74 in a direction which causes valve poppet 62 to unseat first end 64 of valve poppet 62 from high pressure valve orifice 56. According to a preferred embodiment, the inward collapse of demand lever 74 causes valve seat 68 to be unseated from high pressure valve orifice 56. Unseating valve seat allows the pressurized gas to flow into housing 42 through outlet 60 of air chamber 50.

Referring to FIG. 2, as the pressure increases in housing 42 from the admittance of the pressurized gas to meet the requirements of the user, diaphragm 76 moves outwardly allowing demand lever 74 to also move. Once demand lever 74 is no longer retaining valve poppet 62 in the open, unseated position, pressurized gas will again begin to fill and enlarge overbalancing chamber 72. The pressurized gas within overbalancing chamber 72 will begin to act on second face 67 of valve poppet 62, and will once again generate a force acting in the direction opposite of the pressurized gas flow traveling from the first stage regulator. The generated force acting on the larger area of second face 67 will counteract the force acting on the smaller area of first face 65 and will move valve poppet 62 into the closed, seated position whereby high pressure valve orifice 56 is sealed. Valve poppet 62 will remain in the closed position until breathable air is again needed by the user or until the pressurized air source traveling from first stage regulator is stopped.

It is also important to note that the construction, arrangement, and application of the second stage regulator as shown in a preferred and other exemplary embodiments are illustrative only. Although only a few embodiments of the present invention have been described in detail in this disclosure, those skilled in the art who review this disclosure will readily appreciate that many modifications are possible (e.g., compatibility with alternative applications, variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of a preferred and other exemplary embodiments without departing from the spirit of the present invention as expressed in the appended claims.

What is claimed is:

1. A valve assembly for use with a breathing apparatus having a pressurized gas source connected to a regulator having a housing and an inlet, the valve assembly comprising:
   a valve support member coupled to the housing;
   a valve poppet having a first end having a first face and a second end having a second face, the first face having a surface area smaller than a surface area of the second face, the valve poppet moveably coupled to the valve support member for movement between a first position and a second position with respect to the inlet;
   a chamber configured to accept the second end of the valve poppet;
   a passage having a constant cross sectional area extending from the first face to the second face providing fluid communication between the inlet of the regulator and the chamber for allowing gas accumulating in the chamber to act on the second face to urge the valve poppet in the second position; and
   a lever pivotally coupled to the valve poppet that when actuated moves the valve poppet from the closed position to the open position.

2. The assembly of claim 1 wherein the surface area of the first face is between about 50 percent and about 99 percent the surface area of the second face.

3. The assembly of claim 1 wherein the surface area of the first face is about 75 percent the surface area of the second face.

4. The assembly of claim 1 wherein the regulator is a second stage regulator.

5. The assembly of claim 1 wherein the passage is a longitudinal bore extending through the valve poppet.

6. The assembly of claim 1 wherein the valve poppet is slidably movable between the open position and the closed position.

7. The valve assembly of claim 1 further comprising a seal between the second end of the valve poppet and the chamber, wherein the seal is intended to prevent the escape of gas from the chamber.

8. The valve assembly of claim 7 wherein the seal is an O-ring.

9. The assembly of claim 1 wherein the chamber is configured to accept the second end of the valve poppet in a slidably reciprocating manner.

10. The assembly of claim 1 wherein a valve seat defines the first surface of the valve poppet.

11. A second stage regulator for use with a breathing apparatus having a pressurized gas source, the second stage regulator comprising:
   a housing having an inlet configured to be operatively coupled to the pressurized air source;
   a valve assembly coupled to the inlet the valve assembly including:
      a valve support member;
      a valve poppet having a first face located at a first end of the valve poppet and a second face located at a second end of the valve poppet, the first face having a surface area smaller than a surface area of the second face, the valve poppet moveably coupled to the valve support member for movement between an open position and a closed position with respect to the inlet;
      a chamber configured to accent the second end of the valve poppet;
      a passage having a constant cross sectional area extending from the first face to the second face providing fluid communication between the inlet and the chamber for allowing gas accumulating in the chamber to act on the second face for urging the valve poppet in the closed position without the use of a spring; and
   wherein the valve assembly further includes a lever pivotally coupled to the valve poppet that when actuated moves the valve poppet from the closed position to the open position.

12. The assembly of claim 11, wherein the surface area of the first face is between about 50 percent to about 99 percent the surface area of the second face.

13. The assembly of claim 12 wherein the surface area of the first face is about 75 percent the surface area of the second face.

14. The second stage regulator of claim 11 wherein the valve poppet is slidably movable within the valve support member.

15. The second stage regulator of claim 14 further comprising a slidable seal positioned between the second end of the valve poppet and the chamber, wherein the slidable seal prevents the escape of gas from the chamber.

16. The second stage regulator of claim 15 wherein the slidable seal is an O-ring.

17. The second stage regulator of claim 12 wherein the area of the second end face is minimally larger than the area of the first end face.

18. An underwater breathing system for use with a supplied gas, the system comprising:
   a first stage regulator coupled to the supplied gas;
   a second stage regulator coupled to the first stage regulator by a conduit, the second stage regulator comprising:
      a housing having an inlet configured to be operatively coupled to the first stage regulator;
      a valve support system coupled to the housing;
      a valve poppet having a first end having a first face and a second end having a second face, the first face having an active surface area smaller than an active surface area of the second face, the valve poppet moveably coupled to the valve support system for movement between an open first position and a closed second position with respect to the inlet;
      a chamber configured to accept the second end of the valve poppet in a slidable manner; and
      a passage providing fluid communication between the inlet of the housing and the chamber for allowing gas to accumulate in the chamber and act on the active surface area of the second face to urge the valve poppet in the closed second position without requiring a spring.

19. The assembly of claim 18 wherein the active surface area of the first face is between about 50 percent and about 99 percent the size of the active surface area of the second face.

20. The assembly of claim 19 wherein the active surface area of the first face is about 75 percent the size of the active surface area of the second face.

* * * * *